United States Patent [19]

Oba

[11] 4,140,907
[45] Feb. 20, 1979

[54] THERMAL-PLAIN PAPER RECORDING SYSTEM

[75] Inventor: Yuji Oba, Tokyo, Japan

[73] Assignee: Nippon Telegraph and Telephone Public Corporation, Tokyo, Japan

[21] Appl. No.: 817,490

[22] Filed: Jul. 20, 1977

[30] Foreign Application Priority Data

Jul. 29, 1976 [JP] Japan .................................. 51-89688
Jul. 29, 1976 [JP] Japan .................................. 51-89689
Jul. 29, 1976 [JP] Japan .................................. 51-89690
Aug. 10, 1976 [JP] Japan .................................. 51-94518

[51] Int. Cl.² .............................................. G01C 5/16
[52] U.S. Cl. ..................................... 250/316; 250/319
[58] Field of Search ................................ 250/316, 319

[56] References Cited

U.S. PATENT DOCUMENTS

| 3,476,937 | 11/1969 | Vrancken | 250/316 |
| 3,558,881 | 1/1971 | Gold | 250/316 |
| 3,669,706 | 6/1972 | Sanders | 250/316 |
| 4,001,541 | 1/1977 | Hatch et al. | 250/319 |

Primary Examiner—Harold A. Dixon
Attorney, Agent, or Firm—Burgess, Ryan and Wayne

[57] ABSTRACT

Disclosed is a thermal-plain paper recording system wherein one or a plurality of heater means or hot styli or thermal print heads are brought into contact with one surface of a recording sheet and are energizable and de-energizable in response to time serial pattern signals so that a thermally adherent or heat-sensitive coloring substance may be adhered to an elemental area heated on the sheet, whereby an image may be formed in accordance with the thermal distribution pattern of the recording sheet generated by the energization and de-energization of heater means. Also disclosed is a multicolor recording system by color addition or subtraction.

24 Claims, 10 Drawing Figures

THERMAL-PLAIN PAPER RECORDING SYSTEM

BACKGROUND OF THE INVENTION

The present invention relates to a thermal recording system for thermally recording a visible image on a recording sheet.

There have been invented and demonstrated a wide variety of thermal recording systems. One of them is a thermo-sensitive recording system wherein a heat-sensitive substance is heated to produce a color (See U.S. Pat. No. 3,539,375), and in another method known as a thermal ink transfer imaging process, a heat-sensitive coloring substance in the form of a carbon paper is overlapped over a plain paper sheet to transfer an image. (Reference is made to Japanese Patent Laid Open to Public Publication No. 51-15446). The recording sheet used in the thermo-sensitive recording process is a coated paper having a recording layer which seems similar to a plain paper but it produces a color forming no record when brought into contact with an adhesive containing an organic solvent. Furthermore finished copies remain sensitive to heat and can become increasingly dark so that the recorded images are lost. In addition, the color-fastness of the recorded images is so unsatisfactory that the recorded images will be lost within a year in a lighted room.

The thermal ink transfer imaging process is free from the defects of the thermo-sensitive recording process, but still has some defects. First, in addition to the recording sheets, carbon-paper-like coloring sheets must be prepared, and second the coloring sheets must be disposed of after recording.

In order to avoid these problems, there has been invented and demonstrated a recording system wherein the electrophotographic toner electrostatically or magnetically held on a recording sheet of plain paper is thermally fused and adhered to the recording sheet by a thermal print head and the unused toner is recovered for recirculation or reuse. (See French Pat. No. 80,814 which is a continuation of French Pat. No. 1,301,933). In this system, the thermal print head is brought into direct contact with the toner so that it is contaminated with the toner and consequently the recording sheet is contaminated with the toner. Furthermore, when the copying machine is stopped, the toner which has been adhered to the thermal print head adheres to the recording sheet, bridging between the recording sheet and the thermal print head.

In order to solve these problems, there has been invented and demonstrated a process wherein instead of a thermal print head, a laser beam is used to thermally adhere the toner to the recording sheet. (See Japanese Patent Publication Nos. 47-6160 to which U.S. Pat. No. 3,410,203 corresponds, and 47-15769 U.S. patent application Ser. No. 604,353 corresponds). However this process is economically disadvantageous in that it requires a relatively high power laser and a complex optical system for scanning the laser beam upon the recording sheet.

SUMMARY OF THE INVENTION

One of the objects of the present invention is therefore to provide a thermal-plain paper recording system wherein the contamination of a thermal print head or the like may be completely avoided.

Another object of the present invention is to provide a thermal-plain paper recording system which may record an image on a recording sheet of ordinary or plain paper.

To the above and other ends, briefly stated, the present invention provides a thermal-plain paper recording system comprising one or more heater means such as a hot stylus or styluses or thermal print head which is brought into contact with one surface of a recording sheet and is energizable and de-energizable in response to time serial electrical pattern signals, and heat-sensitive coloring substance supply means disposed so as to spray or otherwise apply a heat-sensitive coloring substance (which may be interchangeably referred to as "toner" in this specification) over the other surface of the recording sheet, whereby the heat-sensitive coloring substance may be thermally adhered to the recording sheet to form an image corresponding to a thermal distribution pattern of the recording sheet created by the heater means.

Figure 1:
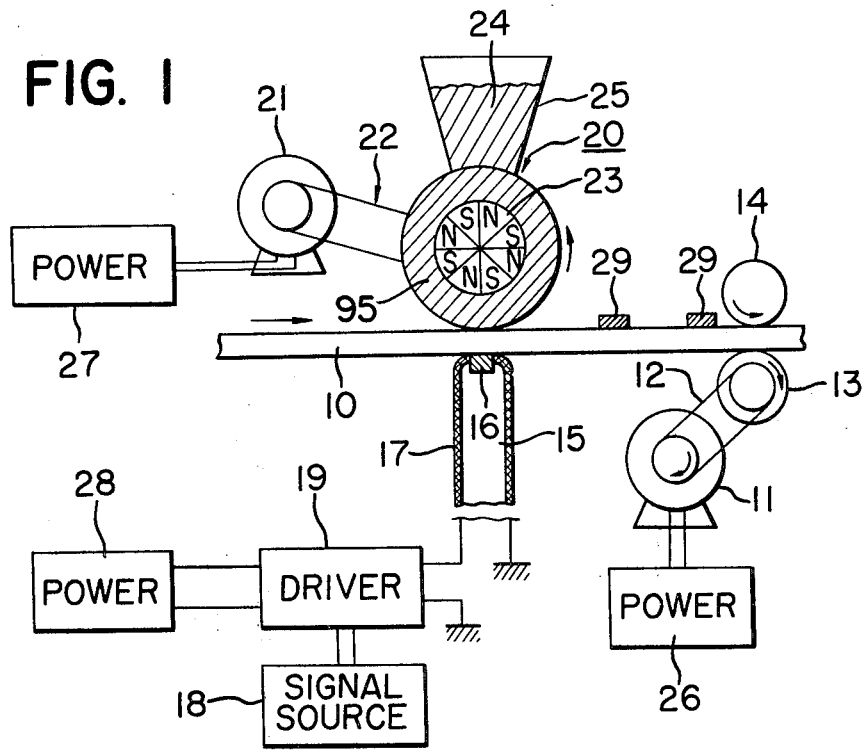
FIGS. 1 through 8 are schematic views of first through eighth preferred embodiments, respectively, of a thermalplain paper recording system in accordance with the present invention.
Figure 2:
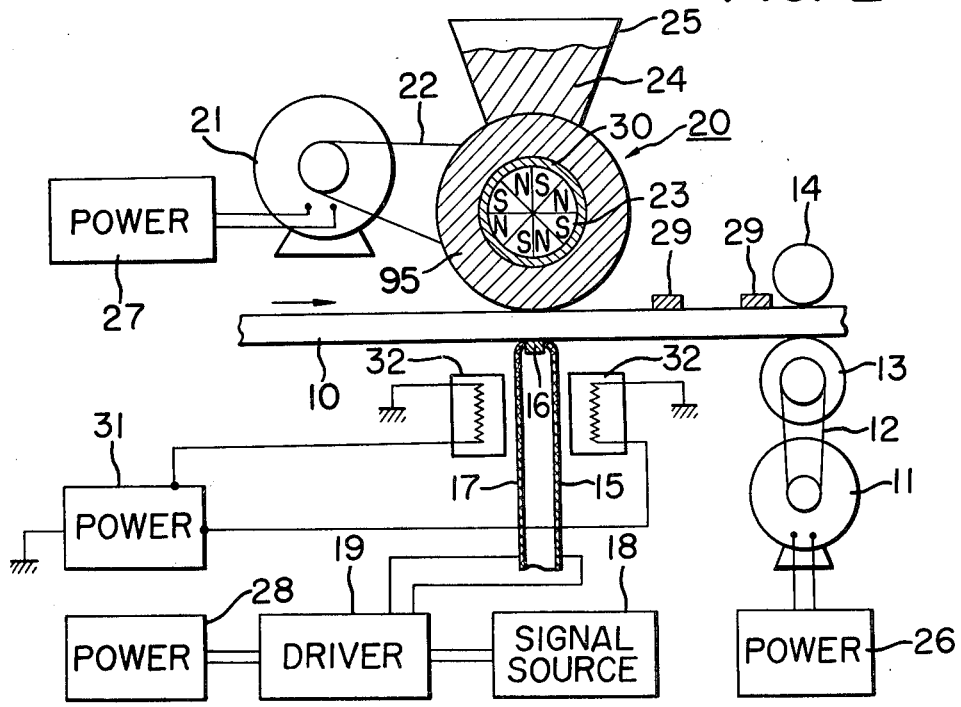
Figure 3:
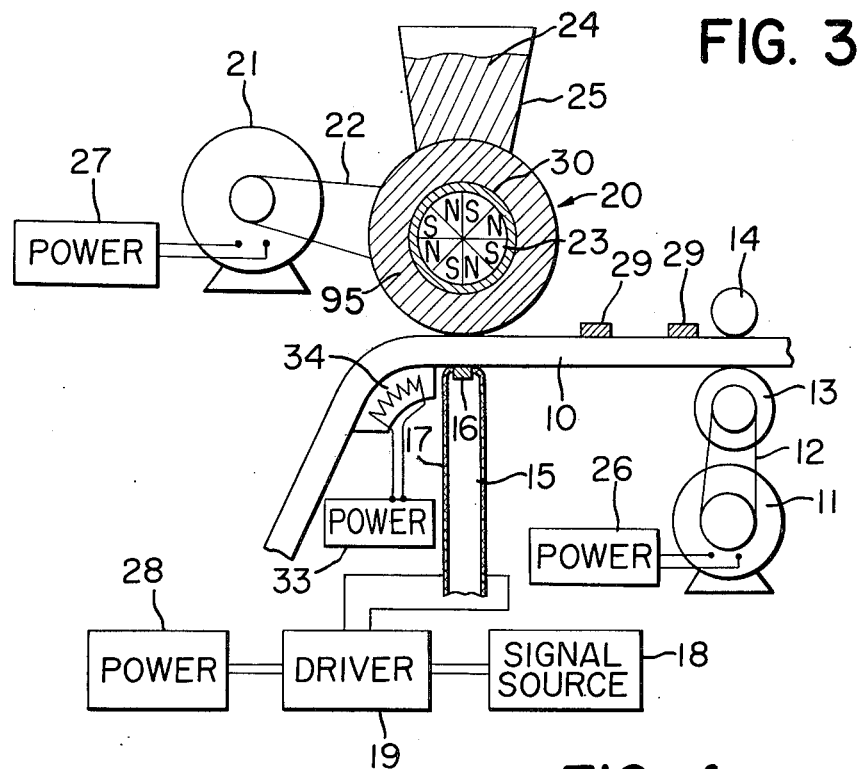
Figure 4:
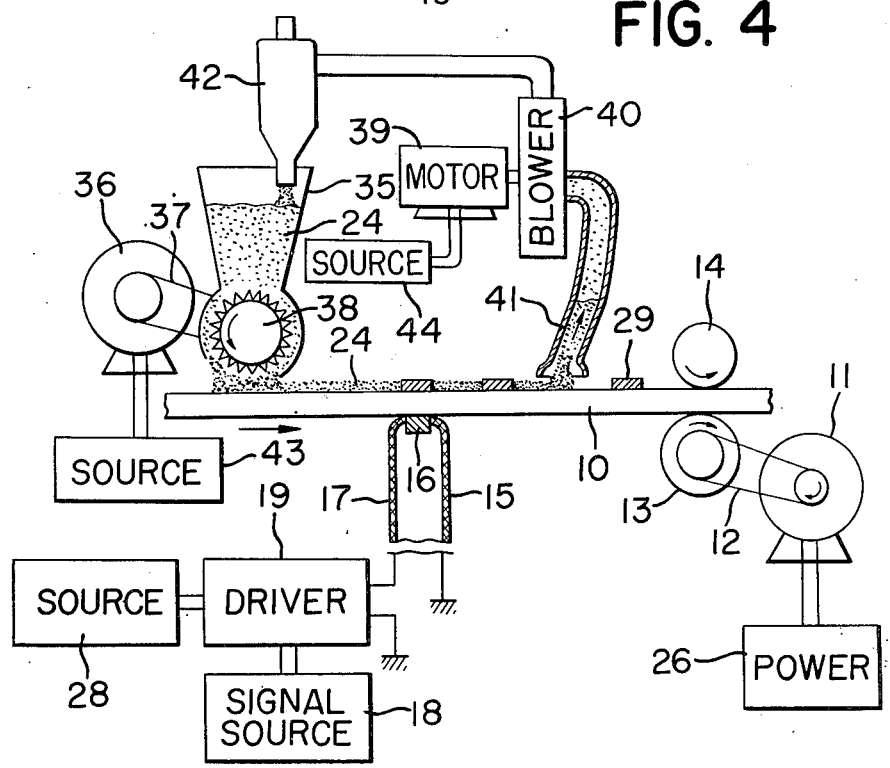
Figure 5:
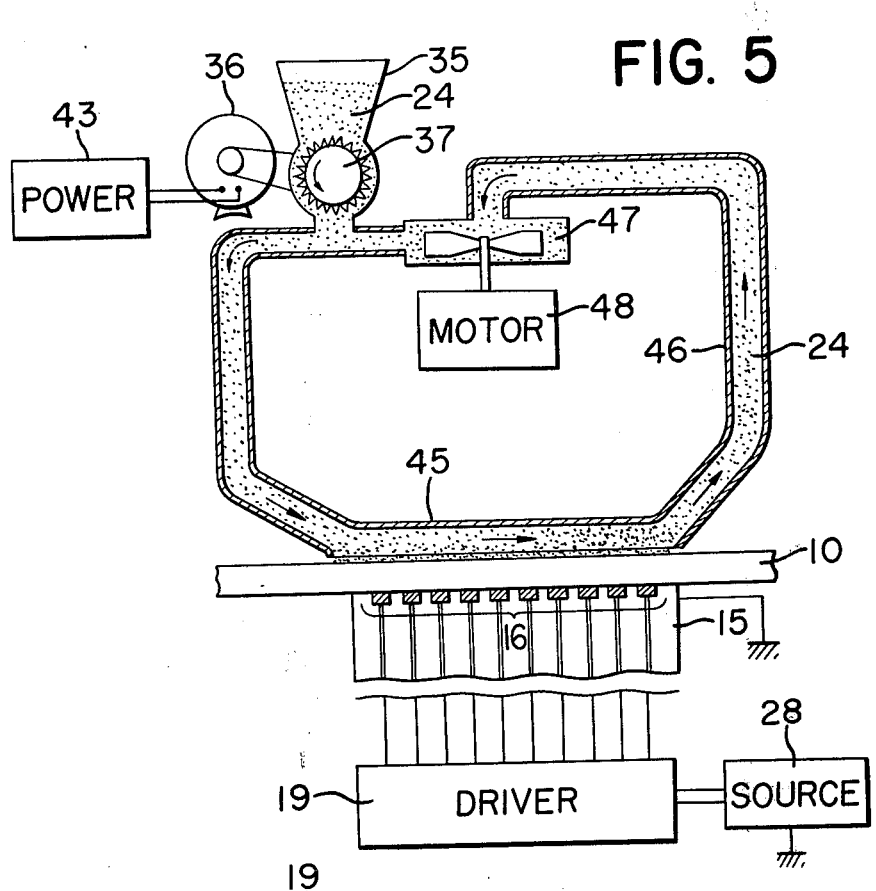
Figure 6:
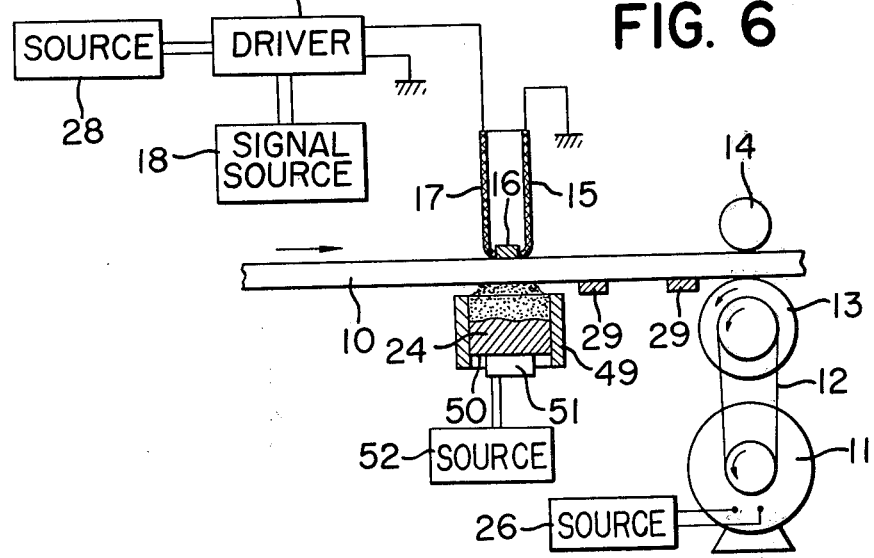
Figure 7:
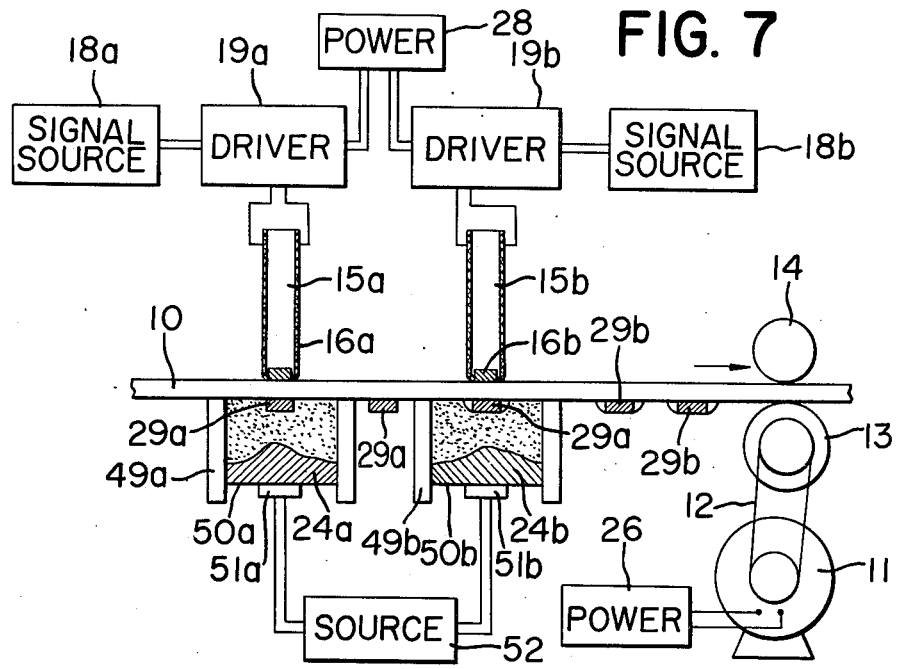
Figure 8:
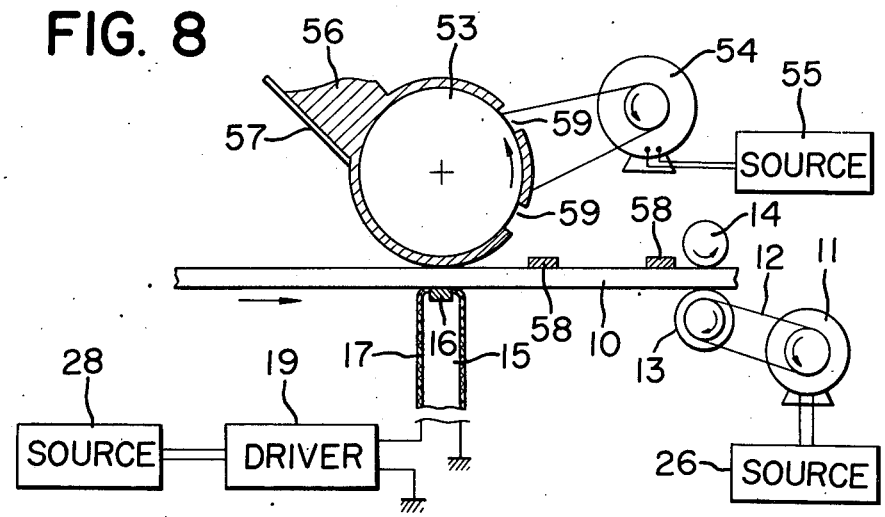

First, second and third embodiments shown in FIGS. 1 through 3, respectively, are of the type incorporating a magnetic brush;

A fourth embodiment shown in FIG. 4 is of the type wherein the unused toner is recovered from the recording sheet by means of a suction blower for recirculation or reuse;

A fifth embodiment shown in FIG. 5 is of the type wherein a heat-sensitive coloring substance is circulated and blown over the recording sheet;

A sixth embodiment shown in FIG. 6 is of the type wherein a heat-sensitive coloring substance is scattered and dispersed upwardly toward a recording sheet by the vibration caused by a vibrator;

A seventh embodiment shown in FIG. 7 is of the type wherein two-color or multi-color images may be recorded;

A eighth embodiment shown in FIG. 8 is of the type wherein a flowable heat-sensitive coloring substance or ink is used; and FIG. 9 is a view used for the explanation of the image formation process in conjunction with the seventh embodiment shown in FIG. 7.

Same reference numerals are used to designate similar parts throughout the figures.

DESCRIPTION OF THE PREFERRED EMBODIMENTS

In FIG. 1 there is shown a first embodiment of a thermal plain paper recording system in accordance with the present invention. A recording sheet 10 is advanced in the direction indicated by the arrow by a drive or capstan roller 13 and a pressure or pinch roller 14, the drive roller 13 being drivingly coupled through an endless belt 12 to a motor 11 connected to a power source 26. A heating element 16 of a heater or thermal print head or hot stylus 15 is brought into contact with the undersurface of the recording sheet 10 and is applied with time serial heating and cooling signals from a driver circuit 19 through a lead wire 17 in response to the signals from a signal source 18, the driver circuit 19 being connected to a power source 28. A coloring substance supply device generally indicated by the reference numeral 20 is disposed in opposed relationship with the heating element 16 and comprised of a magnet brush 23 which is driven through an endless belt 22 by a motor 21 which in turn is powered with a power source 27, and a hopper 25 storing a heat-sensitive coloring substance 24 which is magnetized so that it is attracted around the periphery of the magnetic brush 95.

In operation, the driver circuit 19 generates the hot or heating and cooling or cold signals in response to the signals from the signal source 18, and these hot and cold signals are applied through the lead wire 17 to the heating element 16 of the hot stylus 15 so that the desired portions or elemental areas of the recording sheet 10 may be heated or left not heated. The heat-sensitive coloring substance 24 then adheres to the heated elemental areas, thus forming images 29 or dots of the image.

In FIG. 2 there is shown a second preferred embodiment of the present invention which is substantially similar in construction to the first embodiment described above in conjunction with FIG. 1 except that the magnetic brush 23 is provided with a sleeve 30 and the hot stylus 15 is provided with auxiliary heating elements 32 energizable by a power source 31. Opposed to the first embodiment, the magnet 23 is maintained stationary while the sleeve 30 is driven by the motor 21. Since the auxiliary heating elements 32 are provided, the heating element 16 may be maintained at a temperature lower than a softening or melting point of the heat-sensitive coloring substance 24, and this arrangement is advantageous in that the power consumption of the heating element 16 may be almost reduced one half as compared with the first embodiment.

In FIG. 3 there is shown a third preferred embodiment of the present invention which is substantially similar in construction to the second embodiment except that an auxiliary heating element 34 normally energized by a power source 33 is disposed adjacent to the undersurface of the recording sheet 10 for preheating the same. The third embodiment is also advantageous in that the power consumption of the heating element of the hot stylus 15 may be almost reduced one half as compared with the first embodiment.

In FIG. 4 there is shown a fourth preferred embodiment of the present invention which is substantially similar in construction to the first embodiment except of a heat-sensitive coloring substance supply device comprising a heat-sensitive coloring substance hopper 35 including a feed roller 38 drivingly coupled through an endless belt 37 to a motor 36 connected to a power source 43, a heat-sensitive coloring substance suction duct 41 with its suction port located downstream of the hopper 35, a suction blower 40 which has its suction port communicated with the duct 41 and is driven by a motor 39 which in turn is energized by a power source 44, and a cyclone dust collector 42 whose inlet opening is communicated through a duct with a discharge port of the suction blower 40 and whose discharge opening is directed toward the hopper 35.

In operation, as the feed roller 38 rotates in the direction indicated by the arrow, the heat-sensitive coloring substance 24 is spread over the recording sheet 10. It is not important whether or not the heat-sensitive coloring substance 24 is uniformly distributed over the recording sheet 10, but it is essential that the coloring substance 24 may be continuously spread over the recording sheet 10 without any discontinuity. To this end it is preferable to spread the heat-sensitive coloring substance in a relatively large amount. The heat-sensitive coloring substance 24 adheres only to the elemental areas of the recording sheet 10 which are heated by the hot stylus 15 to form an image or dot 29, and the heat-sensitive coloring substance 24 on the elementary areas which have not been heated is sucked through the duct 41 by the suction blower 40 to be returned to the cyclone dust collector 42, from which the heat-sensitive coloring substance 24 is charged into the hopper 35 for reuse. So far in the first through fourth embodiments, only one hot stylus 15 is shown, but it will be understood that a plurality of such hot styli 15 may be arranged in a desired pattern.

In FIG. 5 there is shown a fifth preferred embodiment of the present invention which is substantially similar to the fourth embodiment shown in FIG. 4 except that the heat-sensitive coloring substance supply device is provided with a loop of a heat-sensitive coloring substance recirculation duct 46 with its feed opening 45 extending transversely of the recording sheet 10 which is transported in the direction perpendicular to FIG. 5. A suction blower 47 driven by a motor 48 is inserted into the duct 46 so that the unused coloring substance 24 may be sucked and recirculated as indicated by the arrows. Therefore the feed roller 38 feeds the heat-sensitive coloring substance in an amount sufficient to supplement the used coloring substance 24. The thermal print head 15 has a plurality of heating elements 16 made into contact with the undersurface of the recording sheet 10 and energizable in response to the hot and cold signals from the driver circuit 19.

In FIG. 6 there is shown a sixth preferred embodiment of the present invention. The hot stylus 15 and its associated components is disposed on the upper surface side of the recording sheet 10 transported in the direction indicated by the arrow while a heat-sensitive coloring substance supply device is disposed below the recording sheet 10. The supply device comprises a vibrating, coloring substance storage container 49 disposed in opposed relationship with the hot stylus 15 and a vibrator 51 attached to a bottom 50 of the container 49 and operatively connected to a power source 52. The bottom 50 of the container 49 is vibrated by the vibrator 51 so that the heat-sensitive coloring substance 24 in the container 49 is caused to scatter and disperse upwardly toward the undersurface of the recording sheet 10 and adheres to the heated elemental areas to form the images or dots 29.

The first through sixth embodiments described above have common advantages in that a thermal print head or a plurality of hot styli may be used for electron switching or scanning purposes and that the recording system may be made compact in size and simple in construction because only the thermal print head or hot styli and the heat-sensitive coloring substance supply device are used.

Next the components, the recording sheet, the heat-sensitive coloring substance and so on will be described in more detail hereinafter. Two types of heater 15 may be used, one type being a hot stylus which is normally energized and the other type being such that it is selectively energized in response to an electrical signal. The latter type may be assembled in the form of a thermal print head for thermally recording various patterns.

The recording sheet 10 may be of paper, plastic, metal foil and so on, and a laminated sheet may be also used. With the recording sheets of paper, it has been confirmed that the higher the bulk density and the thinner the thickness, the better the results become. Here, the bulk density is defined by:

weight per unit of area (gram/m$^2$) / thickness (microns). It is preferably more than 0.8 or between 0.8 and 1.55.

The heat-sensitive coloring substance is preferably made of various compounds having a relatively low melting or softening point. When it is made of a colorless compound, it is preferable to color or add a pigment so that a visible image may be formed. To this end, it is preferable to use the toner which is widely used in electrography and electrostatic recording systems. In electrophotography, the toner transferred onto a recording sheet is thermally fixed after development, and moreover the toner is colored so that it is adapted to be used in the present invention. However, it is desirable that the toner used in the present invention may efficiently adhere to the recording sheet at a temperature lower than the fixing temperature used in electrophotography. That is, the toner will not exhibit adhesiveness at room temperature, but will strongly adhere to the recording sheet at a temperature slightly higher than room temperature. For instance, the toner of the type described may be made of polystyrene resin, epoxy resin, polyvinylchloride and polyvinylbutyral and other organic compounds having a melting point between 50 and 200° C. Moreover, it is preferable that the toner has a low thermal conductivity so that the rapid temperature drop of toner may be avoided. To this end, two methods may be used. One method is to use a compound having a low thermal conductivity while the other method is to make the toner porous. The compounds with low thermal conductivity are for instance polyvinylchloride, polystyrene, polymethacrylate, natural rubber, the natural compounds such as silica, dried clay, mica, etc. and oxides such as titanium oxide, glass, silicon oxides, aluminum oxides, etc.

ment. Alternatively, it may be made of foam plastic as will be described in detail below. The fact that natural silica with the porosity of 3% has a thermal conductivity three times as high as natural silica with the porosity of 15% proves that the higher the porosity of one compound the lower its thermal conductivity becomes.

Porous or foam plastics can be manufactured in general by (a) a physical method utilizing gas under pressure, (b) a method utilizing a solvent, (c) a method for foaming plastics with foaming agents and (d) a chemical methods.

Therefore the porous, heat-sensitive coloring substance can be manufactured by the physical method (a) by heating, under high pressure (100 to 300 atmospheric pressure), a mixture of powders including thermoplastic resins. Alternatively, it can be manufactured by dissolving into the powder mixture an inert gas such as the nitrogen, carbon dioxide or the like at room temperature and charging the powder mixture into an air stream of 300 to 400° C.

The foaming method (b) generally uses thermoplastic resins. For instance, salt or the like is added as a solvent into polyvinylchloride, and is mixed with a pigment and a stabilizer by cooled rolls. Thereafter the mixture is crushed, and the salt is removed with water. Thus, the porous, heat-sensitive coloring substance can be obtained.

The foaming method (c) utilized inorganic and organic foaming or blowing agents which are thermally decomposed to generate or liberate gases such as the nitrogen, carbon dioxide, formalin, etc. Alternatively, a solvent having a low boiling point such as alcohol, benzen, acetone, ether, etc. is heated in excess of its boiling point to foam plastics. The inorganic foaming or blowing agents are for instance bicarbonate, peroxide, aside compounds, etc., and the typical organic foaming or blowing agents are listed below:

| NAME | FORMULA | DECOMPOSITION POINT, ° C | GAS LIBELATED |
|---|---|---|---|
| Diazoaminobenzene | ⟨⟩—N=N—NH—⟨⟩ | 97 | $N_2$ |
| Azoisobutyronitrile | NC—C(CH$_3$)(CH$_3$)—N=N—C(CH$_3$)(CH$_3$)—CN | 103 – 104 | $N_2$ |
| Azohexahydrobenzonitrile | ⟨H⟩(CN)—N=N—(NC)⟨H⟩ | 114 – 115 | $N_2$ |
| Benzenesulfohydrozine | ⟨⟩—SO$_2$—NH—NH$_2$ | 103 – 104 | $N_2$ |
| Dinitrosopentamethylenetetramine | CH$_2$—N—CH$_2$ / ON—N CH$_2$ N—NO / CH$_2$—N—CH$_2$ | 202 – 203 | $N_2$,$CH_2O$ |
| Calciumazide | $CaN_6$ | 110 | $N_2$ |

In general, porosity is very closely corelated with thermal conductivity. Therefore the low thermal conductivity, heat-sensitive coloring substance may be made of for instance a mixture consisting of a porous compound such as cyclor dextrin, cellulose powder, porous silica or the like thermoplastic resin and a pig- The porous, heat-sensitive coloring substance may be manufactured by the foaming method (d). In this method, the phenomenon that urea resin, phenol resin, polyester, isocyanate resin, etc., upon being heated will decompose and liberate gases such as formalin, $CO_2$, etc., and water, which form small bubbles (foam cells).

With the low thermal conductivity and/or porous, heat-sensitive coloring substances of the types described, the thermal energy required for adhering them to the recording sheets can be considerably reduced. With the conventional toner or heat-sensitive coloring substance having a better thermal conductivity, there has been observed the tendency of the toner toward adhering too much on the recording sheet, but this problem may be substantially solved with the toner or heat-sensitive coloring substance in accordance with the present invention. Furthermore, the image quality may be remarkably improved and many other economical advantages may be obtained.

In addition to the heat-sensitive coloring substances of the types described above, the compounds which exhibit plasticity at room temperature or when heated may be also used in the present invention. For instance, polyvinylacetate or emulsion type resin added with a pigment or dye may be used. This type of heat-sensitive, coloring substance exhibits plasticity or elasticity at room temperature and increases its adhesiveness at a temperature higher than room temperature.

Regarding to the magnetized toner, reference is made to Japanese Patent Publication Nos. 37-14799 and 43-3434 and U.S. Pat. No. 3,639,245. However, according to the present invention it is not required to make the heat-sensitive coloring substances of electrically conductive compounds or to impart the electroconductivity to the heat-sensitive coloring substances so that the limitations imposed upon the materials for heat-sensitive coloring substances may be much relaxed and consequently the freedom of the selection of materials may be considerably increased.

When the magnetized, heat-sensitive coloring substance is used in the first, second and third embodiments, the maintenance of the recording system may be simplified and facilitated. That is, since the magnetized, heat-sensitive coloring substance itself serves as a carrier, the other carriers are not required. Therefore, the problem depending on the adhesion of carriers may be solved. In the second and third embodiments shown in FIGS. 2 and 3, the rotary sleeve 30 can divide itself into a portion affected by the magnetic fields of the stationary magnet 23 and a portion unaffected thereby. Therefore when the heat-sensitive coloring substance adheres to the sleeve 30, it may be removed off from the unaffected portion thereof. The heat-sensitive coloring substance adhered to the sleeve 30 may be physically or chemically removed. For example, there are a physical method for scraping away the substance from the sleeve 30 and a chemical method for wiping off the sleeve 30 by solvent.

In general, when the heat-sensitive coloring substance is heated, its particle size is increased. Since the heat-sensitive coloring substance can be completely removed off the sleeve 30 as described above, the oversized particles of the heat-sensitive coloring substance may be easily removed by a suitable conventional screening method.

In FIG. 7, there is shown a seventh preferred embodiment of the present invention capable of reproducing multi-color copies. The seventh embodiment is substantially similar in construction to the sixth embodiment except that additional hot stylus and heat-sensitive coloring substance supply device are installed. That is, the heating elements 16a and 16b of the first and second hot styli 15a and 15b are spaced apart from each other by a suitable distance in the direction of transport of the recording sheet 10, and first and second heat-sensitive coloring substance containes 49a and 49b are disposed in opposed relationship with the first and second heating elements 16a and 16b, respectively. First and second vibrators 51a and 51b are attached to bottoms 50a and 50b, respectively, of the first and second containers 49a and 49b and are operatively connected to a power source 52. The heating elements 16a and 16b are electrically connected to driver circuits 19a and 19b, respectively, so that they may be energized in response to the hot signals from the first and second driver circuits 19a and 19b in a manner substantially similar to that described above. The driver circuits 19a and 19b are connected to a common power source 28 and independent signal sources 18a and 18b, respectively.

In operation, the first and second heat-sensitive coloring substances 24a and 24b are scattered and dispersed upwardly toward the undersurface of the recording sheet 10 as the first and second containers 49a and 49b are vibrated by the vibrators 51a and 51b. Then the first or second hot stylus 15a or 15b is energized in response to the hot signal from the driver circuit 19a or 19b, the heating element 16a or 16b is heated so that the heat is transmitted transversely through the recording sheet 10 from the upper surface to the undersurface thereof. As a result, the first or second heat-sensitive coloring substance 24a or 24b adheres to heated elementary areas, thereby forming the images or dots 29a and 29b.

In this embodiment, it is assumed that the first heat-sensitive coloring substance 24a is black while the second coloring substance 24b, red and that the first and second heating elements 16a and 16b are energized in response to the black and red pattern signals. Then the image or dot 29a is black while the image or dot 29b, red, and two-color (black and red) copies or records may be reproduced.

When the thermal printer heads or hot styli and their corresponding heat-sensitive coloring substances in different colors are increased in number, multi-color copies or records can be obtained. Furthermore, the dots or image in each color may be wholly or partly overlapped to form combinations of many colors. To this end, the dots in each color must be exactly registered with each other in order to avoid color misalignments. One countermeasure may be to form a pair of hot styli 15a and 15b as an integral unit in order to exactly maintain the distance therebetween, but this method cannot overcome the color fringing due to the different thermal expansions of the hot styli 15a and 15b. This problem, however, can be substantially solved by a novel method in accordance with the present invention.

This method is based on the additive or subtractive process in the light absorbing area. That is, when the first dot 29a of the first heat-sensitive coloring substance 24a is overlapped by the second dot 29b of the second heat-sensitive coloring substance 24b, a additively or subt actively mixed color is produced. The first additive type heat-sensitive coloring substance 24a consists of a thermally fusable resin, a pigment of a desired color and a transparent substance capable of producing some color only when thermally fused and mixed with the second heat-sensitive coloring substance 24b. Therefore the first dot 29a as formed on the recording sheet 10 exhibits its inherent color, but when it is overlapped partly or wholly by the second dot 29b an additively mixed result is seen. For instance, assume that the first additive type heat sensitive coloring substance is red and that the second additive type heat-sensitive coloring substance 24b is colorless but capable of producing its inherent color blue only when thermally fused and reacted with the transparent substance contained in the first additive type heat-sensitive coloring substance 24a. Then the first dot 29a as formed is red, but when it is overlapped by the second dot 29b, the overlapped portion becomes dark green or black. The second dot 29b which is not overlapped with the first red dot 29a is transparent.

The examples of the combinations of heat-sensitive additive type coloring substances are listed below:
1. Ferric stearate and tannic acid,
2. Nickel palmitate and sodium thisulfate,
3. Silver oxalate and polyhdroxy alcohol,
4. Silver behenate and protocutechuic acid,
5. Lead behenite and ethylene thiourea,
6. Leuco dye and phenol compounds, organic acids or acidic terra abla, and
7. pH-indicators and acidic or alkaline compounds.

Next the subtractive method or process will be described. The first heat-sensitive coloring substance 24a is color subtractable while the second heat-sensitive coloring substance 24b is a color subtracting agent. Here the color subtraction means that the visible color of the first heat-sensitive coloring substance 24a are decreased by the superimposition of the second heat-sensitive coloring substance 24b. Color subtractable substances contain a mixture of a color forming substance which is colorless or lightly colored and a developer which is colorless. For instance, the color forming substance are lactone compounds, lactam compounds, sultone compounds, spiropyran compounds, leucotriphenyl methan compounds, leucodiphenyl methan compounds, amyl phenothianzine compounds and the like and the developers are for instance phenol compounds, phenol resin, organic acids, Kaolin-type mineral, silicic acid anhydride, aluminum oxide and the like.

The first heat-sensitive coloring substance 24a therefore consists of a colored substance which is not chemically or thermally affected by the second heat-sensitive coloring substance 24b and a color subtractable substance which is color subtracted by the second coloring substance 24b. The color subtracting substance 24b consists of for instance poly ether and its derivatives, polyethylene glycol derivatives and the like. For instance, assume that the first heat-sensitive coloring substance includes a black pigment. Then the portion of the first dot 29a overlapped with the second dot 29b turns red.

In FIG. 8 there is shown an eighth embodiment of the present invention wherein a plastically flowable, heat-sensitive coloring substance is utilized. The eighth embodiment is substantially similar in construction to the first embodiment except a heat-sensitive coloring substance supply device comprising an ink applicator roller 53 driven through an endless belt by a motor 54 powered with a power source 55 and a doctor 57 for inking the applicator roller 53 with a plastically flowable, heat-sensitive coloring substance 56 to be referred to as "ink". When the ink 56 is made into contact with an elemental area of the recording sheet 10 which is heated by the hot stylus 15, it is fused and adhered to the recording sheet 10, forming images or dots 58. As a result, recesses or avities 59 are formed in the layer of ink 56 around the applicator roller 53, but they may be filled with the ink 56 by the doctor 57 as the applicator roller 53 rotates in the direction indicated by the arrow, so that the smoothly surfaced layer of ink 56 may be always made into contact with the recording sheet 10. A large number of copies or recordings may be obtained without causing any serious degradation or ageing of the ink 56 and applicator roller 53.

The ink 56 must be plastically flowable and exhibits increased adhesivity when heated. The compounds which satisfy these conditions are for instance carnauba wax, paraffin, vinylchloride with a low degree of polymerization, plastics added with plasticizers, colloidal solutions, etc., but most of these materials are colorless so that dyes and pigments must be added to them. In operation, it is preferable to normally heat the ink 56 in order to suitably adjust the plasticity or flowability of the ink 56.

Next some EXAMPLES of the present invention will be described in conjunction with the preferred embodiments thereof.

EXAMPLE 1

The recording system shown in FIG. 1 was used with the magnetized black toner used in electrophotography. The recording sheet 10 was transported at a speed of about 30 cm/min. while the hot stylus 15 was intermittently energized. A straight line consisting of 20 black dots per centimeter was obtained. Since the straight line was lightly adhered to the recording sheet 10, this sheet was heated at 200° C. for a few seconds with a heating plate to fix the dots so as to obtain a permanent image.

EXAMPLE 2

Following the procedures of EXAMPLE 1, a straight line consisting of black dots was recorded on the recording sheet of polyester film, and then the polyester film (25 $\mu$m thickness) was made into contact with a plain paper sheet and was heated to 200° C. Thereafter they were separated from each other and the black straight line was transferred onto the plain paper sheet. Since the thermal conductivity of the plain paper sheet will not affect the recording process, thick plain paper sheets may be used.

EXAMPLE 3

The recording system of the type shown in FIG. 2 was used with the auxiliary heating elements 32 being normally energized so as to normally maintain the temperature of the hot stylus 15 at about 70° C. The heat-sensitive coloring substance having a softening point between 121° C. and 128° C. was used. The power consumption of the heating element 16 could be reduced one half as compared with the recording system not provided with the auxiliary heating elements 32.

EXAMPLE 4

The recording system of the type shown in FIG. 3 was used so that the recording sheet 10 was preheated to 90° C. by the auxiliary heating element 34. The recording was made following the procedures of EXAMPLE 1, and it was found that the power consumption of the hot stylus 15 is reduced to one half as compared with the recording system not provided with the preheating element 34.

EXAMPLE 5

The recording system of the type shown in FIG. 4 was used, and wax powder having a melting point of about 80° C. was used as the heat-sensitive coloring substance 24. The image obtained was colorless so that the recording sheet 10 was heated again to melt the wax image and a red pigment was sprayed over the recording sheet 10 so as to obtain a red image.

EXAMPLE 6

The recording system of the type shown in FIG. 5 was used, and the powders consisting of carbon black and finely divided particles of thermoplastic resin was sprayed as the heat-sensitive coloring substance 24 over the recording sheet 10 while the heating elements 16 were selectively energized so that a black image was obtained.

EXAMPLE 7

The two-color recording system of the type shown in FIG. 7 was used. The first heat-sensitive coloring substance 24a consists of 50% by weight of red iron oxide and 50% by weight of finely divided particles of bisphenol-A, and the second coloring substance 24b consists of crystal violet lactone. In order to form a red image 24a, the first hot stylus 15a was energized while the second hot stylus 15b was kept de-energized. To form a black image, a red image or dot was first formed and then was reheated by the second hot stylus 15b so that the bisphenol-A contained in the first heat-sensitive coloring substance 24a and crystal violet lactone contained in the second coloring substance 24b reacted to produce a blue pigment. The red and blue pigments are additively mixed to produce greenish black so that the dot or image 29b' wherein the first heat-sensitive coloring substance 24a was overlapped with the second coloring substance 24b turned to greenish black. Since the second coloring substance 24b is colorless, the image or dot formed thereby and out of contact with the image or dot of the first coloring substance 24a remains colorless. Therefore the image formed on the recording sheet 10 essentially consists of dots of the first heat-sensitive coloring substance 24a formed by the energized hot stylus 15a so that the color misalignment problem will not occur which will degrade the image quality.

EXAMPLE 8

The recording system of the type shown in FIG. 7 was also used. The first heat-sensitive coloring substance 24a was prepared by mixing two parts by weight of 3, 7-bisdiethylamino fluoran, two parts by weight of p-hydroxybenzoate and one part by weight of cadminum red with 10 parts by weight of toluene, drying this solution to obtain black substance and thereafter finely dividing this black substance. The second coloring substance 24b consists of finely divided particles of polyethylene glycol which reacts with 3, 7-bisdiethylamino fluoran contained in the first heat-sensitive coloring substance 24a so as to render 3, 7-bisdiethylamino fluoran colorless.

Following the procedures of EXAMPLE 7, first a black image or dot was formed by energizing the first hot stylus 15a, and thereafter the second hot stylus 15b was energized to heat the black dot so that the second coloring substance 24b was overlapped or superimposed on the black dot, which in turn was subtractively turned to red.

Figure 9A:
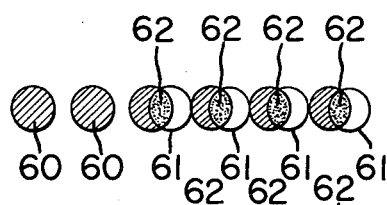
Figure 9B:
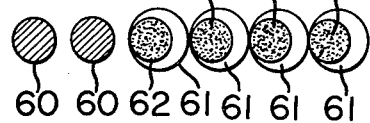

In both EXAMPLES 7 and 8, the elemental area heated by the first hot stylus 15a is smaller than the elemental area heated by the second hot stylus 15b in order to avoid the color misalignments due to the misregistration of the elemental areas heated by the first and second hot styli 15a and 15b. This will be described in more detail with particular reference to FIG. 9. When, as shown in FIG. 9(a), the first and second dots 60 and 61 of the first and second coloring substance 24a and 24b, respectively, have the same size, even a very small misregistration between the first and second dots 60 and 61 leaves some portion (white area) of the first dot 60 uncovered with the second dot 61, the overlapping portion being indicated by black. However, when the second dot 61 is larger in size than the first dot 60 as shown in FIG. 9(b), the first dot 60 is completely overlapped with the second dot 61 even when there occurs some misregistration or misalignment there between so that the colors of the first and second dots 60 and 61 may be completely additively or subtractively mixed as indicated by 62. Moreover the second coloring substance 24b and hence the second dot 61 are colorless so that the portion of the second dot which does not overlap with the first dot 61 remains colorless or is not "recorded". One method for varying the areas of the first and second dots 60 and 61 is to vary the elemental areas to be heated by the first and second hot styli 15a and 15b, and another method is to vary the heating time and/or the heat applied to the elemental areas. By either method good image quality may be ensured.

EXAMPLE 9

The recording system as shown in FIG. 8 was used with the ink 56 consisting of paraffin having a melting point between 42 and 44° C. and carbon black. The recording sheet 10 was transported at a speed of 30 cm/min., and a black straight line consisting of 20 dots per centimeter was formed. The recording sheet 10 will not be colored by mere contact with the black ink 56, but is colored only when heated.

EXAMPLE 10

Following the procedures of EXAMPLE 9, recording was made with emulsion wax on a plain paper sheet. Thus obtained image is discernible because of the difference in transparency.

EXAMPLE 11

Following the procedures of EXAMPLE 9, the recording was made with the plastically flowable ink 56 consisting of vinylchloride with the degree of polymerization of about 300 added with oilblue-G extra, the temperature of the ink being maintained about 50° C. An image of a straight line was obtained.

What is claimed is:

1. A thermal-plain paper recording system comprising
   (a) heater means including a heating element adapted to be energized and de-energized in response to time serial signals relating to the information to be recorded,
   (b) a recording sheet which is transported in one direction with one of the major surfaces thereof in contact with said heater means,
   (c) means for bringing a heat-sensitive coloring substance into contact with the other major surface of said recording sheet, and
   (d) heat-sensitive coloring substance supply means for supplying said heat-sensitive coloring substance over the other major surface of said recording sheet, whereby said heat-sensitive coloring substance may be adhered to said other major surface of said recording sheet according to the thermal distribution thereof.

2. A thermal-plain paper recording system as defined in claim 1 wherein said heater means are arranged in one row.

3. A thermal-plain paper recording system as defined in claim 1 wherein said heater means has a plurality of heating elements arranged in one row.

4. A thermal-plain paper recording system as set forth in claim 1 wherein said heater means is provided with auxiliary heating elements which are normally energized by power source means.

5. A thermal-plain paper recording system as defined in claim 1 wherein a preheating element which is normally energized by a power source means is brought into contact with said recording sheet for preheating the same.

6. A thermal-plain paper recording system as defined in claim 1 wherein said heat-sensitive coloring substance supply means includes a rotating magnetic brush.

7. A thermal-plain paper recording system as defined in claim 1 wherein said heat-sensitive coloring substance supply means includes a stationary magnet and a sleeve fitted thereover.

8. A thermal-plain paper recording system as defined in claim 1 wherein said heat-sensitive coloring substance supply means is adapted to spray said heat-sensitive coloring substance over said the other major surface of said recording sheet and includes a suction blower for recovering the unused heat-sensitive coloring substance therefrom for recirculation.

9. A thermal-plain paper recording system as set forth in claim 1 wherein said heat-sensitive coloring substance supply means is adapted to blow said heat-sensitive coloring substance over the other major surface of recording sheet.

10. A thermal-plain paper recording system as set forth in claim 1 wherein said heat-sensitive coloring supply means includes a vibrator for vibrating said supply means so that said heat-sensitive coloring substance may be scattered and dispersed upwardly toward the other major surface of said recording sheet.

11. A thermal-plain paper recording system as defined in claim 1 wherein said heat-sensitive coloring substance includes magnetic particles.

12. A thermal-plain paper recording system as defined in claim 1 wherein said heat-sensitive coloring substance includes porous materials.

13. A thermal-plain paper recording system as defined in claim 1 wherein said heat-sensitive coloring substance has a porous structure.

14. A thermal-plain paper recording system as defined in claim 11 wherein said magnetic particles are selected from a thermally adherent organic compound group consisting of polystyrene resin, epoxy resin, polyvinylchloride and polyvinylbutyral.

15. A thermal-plain paper recording system as set forth in claim 1 wherein said heat-sensitive coloring substance consists of a plastically flowable ink.

16. A thermal-plain paper recording system as set forth in claim 15 wherein said ink includes paraffin or polyvinylacetate.

17. A thermal-plain paper recording system comprising (a) first and second heater means spaced apart from each other by a suitable distance in the direction of transport of a recording sheet, made into contact with one of the major surfaces of said recording sheet and adapted to be energized and de-energized in response to time serial signals, and (b) first and second heat-sensitive coloring substance supply means disposed in opposed relationship with said first and second heater means, respectively, for supplying first and second heat-sensitive coloring substances over the other major surface of said recording sheet, whereby said first and second heat-sensitive coloring substances may be thermally adhered to said other major surface of said recording sheet according to the thermal distribution thereof.

18. A thermal-plain paper recording system as set forth in claim 17 wherein said second heater means is so energized that said second heat-sensitive coloring substance is caused to thermally adhere to and overlap with an image or dot formed by the energization of said first heater means with said first heat-sensitive coloring substance.

19. A thermal-plain paper recording system as set forth in claim 17 wherein a plurality of one or more two heater means are provided and the number of said heat-sensitive coloring substance supply means is increased accordingly.

20. A thermal-plain paper recording system as set forth in claim 18 wherein when said second heat-sensitive coloring substance is overlapped with an image or dot formed by the energization of said first heater means with said first heat-sensitive coloring substance, an additively mixed color may be produced.

21. A thermal-plain paper recording system as set forth in claim 18 wherein when said second heat-sensitive coloring substance is overlapped with an image or dot formed by the energization of said first heater means with said first heat-sensitive coloring substance, a subtractively mixed color may be produced.

22. A thermal-plain paper recording system as set forth in claim 18 wherein said second heater means heats an elementary area of said recording sheet greater than an elementary area heated by said first heater means.

23. A thermal-plain paper recording system as set forth in claim 20 wherein said first heat-sensitive coloring substance includes a colorless or lightly colored compound selected from a group consisting of lactones, lactames, sultones, spiropyrans, leucotriphenylmethans, leucodiphenylmethanes, and almiphenothiazins; and said second heat-sensitive coloring substance includes a compound selected from a group consisting of phenols, phenol resins, organic acids, kaoline type minerals, silicic acid anhydride, and aluminum oxides.

24. A thermal-plain paper recording system as set forth in claim 21 wherein said first heat sensitive coloring substance includes one compound or a combination of compounds selected from a group consisting of lactones, lactames, sultones, and a group consisting of phenols, phenol resins and organic acids; and said second heat-sensitive coloring substance includes one compound selected from a group consisting of polyethers, derivatives thereof, polyglycols and derivatives thereof.

* * * * *

UNITED STATES PATENT OFFICE
CERTIFICATE OF CORRECTION

Patent No. 4,140,907         Dated  February 20, 1979

Inventor(s)  Yuji Oba

It is certified that error appears in the above-identified patent and that said Letters Patent are hereby corrected as shown below:

Column 1, line 55:  after "47-15769" insert --to which--.

Column 2, line 42:  "A" should be --An--.

Column 8, line 4:  "containes" should be --containers--.

line 58:  "a" should be --an--.

line 67:  "whooly" should be --wholly--.

Signed and Sealed this

Second Day of October 1979

[SEAL]

Attest:

RUTH C. MASON
Attesting Officer

LUTRELLE F. PARKER
Acting Commissioner of Patents and Trademarks